Oct. 13, 1970 G. J. SALLET 3,534,343

TUNNEL STRUCTURE FOR A PLATED WIRE MAGNETIC MEMORY

Filed Feb. 8, 1968

INVENTOR.
GEORGE J. SALLET
BY W. Hugo Liepmann
ATTORNEY

United States Patent Office 3,534,343
Patented Oct. 13, 1970

3,534,343

TUNNEL STRUCTURE FOR A PLATED WIRE MAGNETIC MEMORY

George J. Sallet, West Acton, Mass., assignor to Honeywell Inc., Minneapolis, Minn., a corporation of Delaware Filed Feb. 8, 1968, Ser. No. 703,948
Int. Cl. G11c *11/14*
U.S. Cl. 340—174 13 Claims

ABSTRACT OF THE DISCLOSURE

A plated wire tunnel structure for a memory plane has a dielectric spacer, suitably woven, on either side of a layer of tunnels, with each tunnel housing a plated wire memory element.

BACKGROUND

This invention relates to a plated wire magnetic memory. More particularly, it provides a plated wire memory plane having superior dimensional, structural, thermal, and electrical properties and which can be produced at low cost with high uniformity. The invention thus makes possible the low cost construction of improved plated wire memories, which are used for storing digital information in computers and like equipment.

Plated wire memories, as the more familiar core memories, are built up of sub-assemblies termed planes. Each plane, usually a planar unit layered with other like planes in a stack, consists of a two-dimensional array of storage devices, each of which is capable of storing one binary digit of information.

It is conventional to construct plated wire memory planes with a tunnel structure in which plated wire memory elements arranged side-by-side in a grid are disposed in separate tunnels formed in a relatively thin dielectric slab. Word straps extend transverse to the plated wires adjacent the opposed lateral surfaces of the slab so that the magnetic field developed by current in a word strap couples with the plated wires the word strap traverses. For further information, see for example, U.S. Pat. 3,175,200 of G. G. Hoffman and J. A. Turner entitled Data Storage Apparatus and G. A. Fedde, Plated Wire Memories, Electronics, May 15, 1967, pages 101–109.

The plated wires are threaded into the tunnels after the structure is fabricated, and are free to slide within the tunnel, in order to avoid subjecting the wires to physical strains. Ths is because the magnetic properties of plated wires are generally strain sensitive. Further, it is often desirable to replace a defective plated wire without disturbing the rest of the memory plane.

Tunnel structures have been formed starting with a dielectric sheet machined with slots to receive the plated wires. However, due to the miniature dimensions involved, the slotted sheet is costly to prepare. Further, this approach is not well suited for achieving thin tunnel structures, for example, where the total thickness is only a fraction larger than the tunnel diameter.

Plated wire tunnel structures have also been fabricated by laminating together two sheets of plastic or other dielectric with a grid of tunnel-forming rods such as taut wires, or the plated wire themselves, between the sheets. Molded tunnel structures, where a layer or grid of tunnel-forming wires is embedded in a molded slab of plastic, have also been attempted.

The laminated tunnel structure has generally been unsatisfactory due to problems such as delamination. Another shortcoming of many prior constructions is the lack of sufficient stiffness to support the plated wires adequately. Also, manufacturing costs for prior tunnel structures have been relatively high.

In addition, the attainment of uniform tunnel spacings has been a continuing problem, particularly in lower cost tunnel structures. Variations in the spacings of the tunnels from the lateral surfaces of the tunnel structure are undesirable not only for mechanical considerations but also because they result in non-uniform and unbalanced magnetic coupling between the plated wires and the word straps. Similarly, variations in the spacings between adjacent tunnels result in non-uniform electrical and magnetic couplings.

Accordingly, it is an object of the present invention to provide an improved plated wire memory. More particularly, it is an object to provide a plated wire memory plane having improved structure and improved electrical characteristics.

Another object of the invention is to provide a plated wire memory in which the plated wires are substantially uniformly spaced from each other and from the word straps or other drive conductors to which they are magnetically coupled.

A further object of the invention is to provide a plated wire tunnel structure and memory plane readily manufactured with uniformity and at relatively low cost.

It is also an object of the invention to provide a laminated plated wire memory plane that is essentially free of delamination.

Another object of the invention is to provide a plated wire tunnel structure suited for construction with dielectric materials having mechanical and thermal properties that provide uniform and reliable operation.

Other objects of the invention will in part be obvious and will in part appear hereinafter.

The invention comprises the features of construction, combinations of elements and arrangements of parts exemplified in the constructions hereinafter set forth, and the scope of the invention is indicated in the claims.

SUMMARY OF THE INVENTION

The invention provides a plated wire memory plane in which the tunnels, and hence plated wires, are uniformly spaced from each other and from the word straps; the prior art variations in these spacings are essentially eliminated. The word straps are readily firmly secured to the tunnel structure; with the preferred materials the prior art delamination problems do not arise. Further, the preferred materials for the memory plane have such low thermal expansion that thermally caused dimensional variations are relatively negligible. This latter feature contributes to the long life and stable operation of the memory plane. The memory plane is also uniformly thin. Moreover, it can be made readily.

The invention realizes the foregoing advantages and features by providing a plated wire memory plane in which dielectric spacers are sandwiched together with the layer of plated wire-receiving tunnels between them. The spacers are of a dielectric material that maintains a specified thickness throughout the fabrication of the memory as well as during operation. Hence the illustrated spacers do not flow under the heat and pressure encountered in manufacturing, and they resist crushing.

Further, for the manufacturing process described below, the spacers are porous to the dielectric material, such as synthetic resin, that bonds them together. It is also desirable that the spacers absorb the bonding material. The porous and absorbing properties desired for the spacers are met by making them of fibrous material. The fibers can, for example, be of glass, plastics that do not flow at the temperatures encountered in making or using the memory plane, and like materials. Further, the fibers can be formed into the spacers by many conventional ways, including wearing, matting and water-laying. The spacer is preferably pre-impregnated with the bonding material to facilitate manufacture.

BRIEF DESCRIPTION OF DRAWING

For a fuller understanding of the nature and objects of the invention, reference should be had to the following detailed description, taken in connection with the accompanying drawings in which.

DESCRIPTION OF PREFERRED EMBODIMENT

Figure 1:
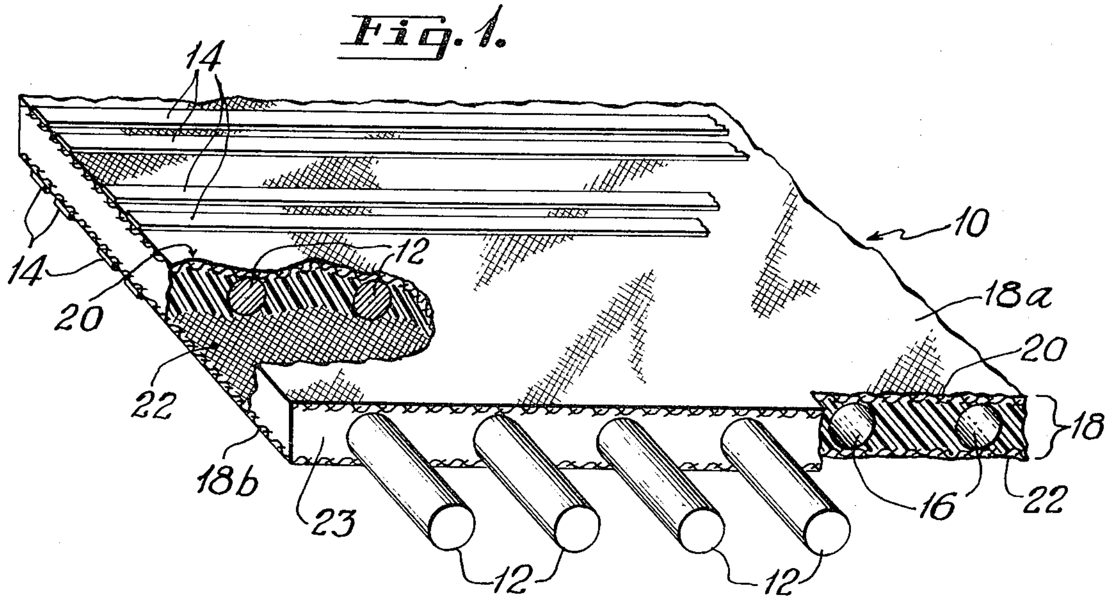
FIG. 1 is a fragmentary perspective view, partly broken away, of a plated wire memory plane embodying features of the invention.

The illustrated memory plane indicated generally at 10 in FIG. 1 has a layer of plated wires 12 between and extending transverse to two layers of conductive word straps 14. Each plated wire 12 is disposed in a tunnel 16 extending longitudinally through a tunnel structure 18 in the form of a slab or thin sheet. The word straps are secured to the tunnel structure; all of which is conventional.

In accordance with the invention, the tunnel structure 18 has a dielectric spacer 20 above the tunnels and a like spacer 22 below the tunnels; the illustrated spacers are sheet-like and of equal thickness. The two spacers define the spacings between each tunnel 16 and the upper and lower surfaces **18*a* and 18*b* of the tunnel structure. They hence constrain the tunnels to be equally spaced from the lateral surfaces 18*a* and 18*b*. A dielectric bonding material 23 bonds the spacers together and fills the balance of the spaces between the tunnels 16**.

A preferred spacer illustrated in FIG. 1 is a cloth woven of glass or thermosetting plastic. By way of example, each cloth spacer 20 and 22 is 0.001 inch thick, as measured at the crossover of intersecting goof and warp strands. By way of comparison, each tunnel 16 has a diameter of 0.007 inch, so that the total thickness of the structure 18 is 0.009 inch.

With further reference to FIG. 1, the cloth spacers 20 and 22 are oriented with the weave diagonal to the plated wires 12, i.e. the woof and the warp of the woven spacer are each offset 45° from the longitudinal axes of the tunnels 16. The purpose of this bias orientation is to ensure that a uniform thickness of cloth spacer is on each side of each tunnel and, further, to ensure uniform spacings between adjacent tunnels. In particular, during fabrication with a woven spacer oriented with one set of strands parallel to the tunnel-forming wires, the pressure applied between the surfaces **18*a* and 18*b*** to press the spacers against the forming wires tends to displace these strands relative to the tunnels to the condition where the parallel strands lie between the tunnels, rather than having strands directly above and below the tunnels. As a result, the tunnels are covered by only the single thickness of the strands extending orthogonal to them. Further, in the process of shifting from above or below the tunnelling wires to between them, the strands parallel to the forming wires tend to displace the forming wires sideways, resulting in non-uniform spacings between adjacent tunnels and hence between adjacent plated wires; a condition considered undesirable.

The tunnel structure 18 of FIG. 1 can be made by placing the lower spacer 22 in a shallow mold below a grid of tensioned tunnel-forming wires. Sufficient dielectric bonding material 23, such as a thermosetting resin, is provided in the mold and the upper spacer 20 laid in place. After the mold top is put in place, the mold is heated and subjected to pressure to press the spacers against the tunnelling wires. The heat and pressure cause the bonding material to flow throughout the spacers and the stretched forming wires. Steps are also taken to remove air bubbles that might cause mechanical or electrical disturbances in the final tunnel structure. The subsequent processing and curing depends on the particular spacer and bonding materials used.

After the spacers and bonding material are thus laminated together and cured, the tunnel-forming wires are removed and plated wires inserted in the resulting tunnels. The word straps 14 are secured to the tunnel structure 18 by whatever process desired.

As indicated above, the cloth spacer has a thickness equal to the desired spacing between the tunnels and the surfaces **18*a* and 18*b*** to which the word straps are secured. The cloth preferably has a plain weave in that the woof and warp strands are woven identically.

Alternative to using a woven spacer, other structures can be used. One desired structural feature of the spacer, as already noted, is that it not displace the tunnel-forming wires. Further, it should maintain a specified thickness throughout the manufacture of the memory plane and during use; hence it should be crush resistant and dimensionally stable at the elevated temperatures likely to be encountered. The spacer also should be porous and absorbent to the bonding material which, together with the spacers, constitutes the tunnel structure. It is further desired that the spacers, together with the bonding material, have sufficient stiffness to support the plated wires without undue flexing.

A desired electrical property of the spacer is that it have a low dielectric constant in order to provide minimal electrical capacity between the plated wires 12 and the word straps 14. This is desired to facilitate high speed operation of the memory plane. It is further desirable, although generally considered of less importance, that the spacer material have relatively high thermal conductivity to conduct Joule heat away from current-carrying conductors in the memory plane.

Matted and waterlaid sheets are examples of spacer structures that are considered suitable in addition to woven ones. A preferred material for these spacers, whether woven, matted or waterlaid, is a thermosetting synthetic fiber such as polyester fiber (one commercially available as Dacron) or acrylic fiber (commercially available under the name Orlon). In addition, fibers of glass, linen or cellulose can be used. It is also convenient and hence desired that the spacers be preimpregnated or otherwise arranged to carry at least a portion of the bonding material.

The bonding material 23 in the FIG. 1 tunnel structure 18 is an insulator having a low dielectric constant, as is desired for the spacer. In addition, the material should have a low thermal coefficient of expansion after being cured, and low shrinkage. The low thermal expansion coefficient is desired to minimize dimensional changes in the memory plane when the environmental temperature varies. Where the bonding material does not have a sufficiently low thermal expansion coefficient, extreme temperatures can produce sufficient expansion to fracture the conductors 14. A further desired characteristic of the bonding material is that when first heated and subjected to pressure in the process of laminating the spacers together, it should be sufficiently viscous to flow through the interstices of the spacers 20 and 22 and, further, to flow throughout the spacers between the tunnel-forming wires without displacing the wires. By way of illustration, epoxy resin is a suitable bonding material for use with spacers of glass fibers; Hysol Corporation (Olean, N.Y.) resin R8–2038 and hardner H2–3404 being an example of one such epoxy resin. With spacers of thermosetting polyester or acrylic plastic as noted above, a polyester resin is preferred.

These bonding materials are desired in part because they are essentially free of delamination problems. This is in contrast to prior tunnel structures laminated of Mylar, Kapton or like sheets which frequently came apart. Further, the word strap conductors 14, or other conductive or insulating layers, can be bonded firmly to the epoxy and polyester resins of the tunnel structure 18 with little likelihood of subsequent delamination.

Figure 2:
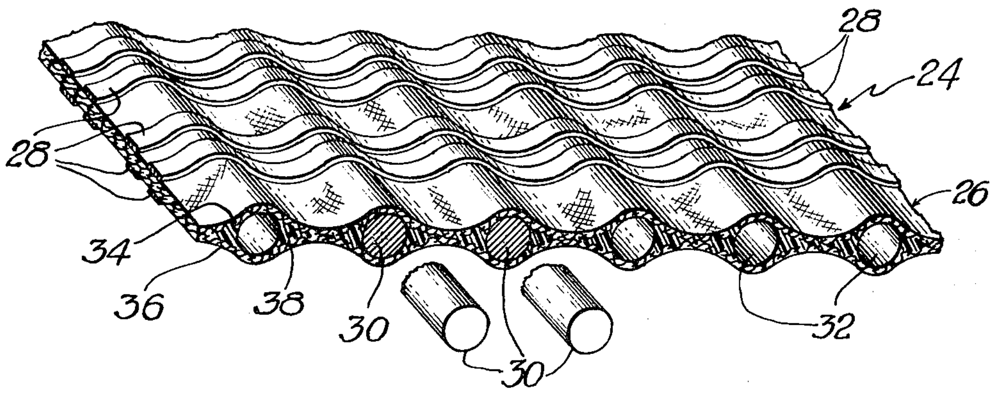
FIG. 2 is a fragmentary perspective view of another plated wire memory plane according to the invention.

Turning to FIG. 2, it shows a plated wire memory plane indicated generally at 24 in which the tunnel structure 26 has a corrugated cross-section to enable the word straps 28 to couple closely with plated wires 30 disposed in tunnels 32. The tunnel structure 26 is formed, as in FIG. 1, by laminating upper and lower dielectric spacers 34 and 36, respectively, together about tunnel-forming wires with a dielectric bonding material 38.

In summary, described above is a new plated wire memory structure that is fascile to manufacture with a high degree of uniformity, particularly dimensional and hence electrical. Further, the structure is mechanically rugged and operationally reliable.

It will thus be seen that the objects set forth above, among those made apparent from the preceding description, are efficiently attained. Further, since certain changes may be made in the above construction without departing from the scope of the invention, it is intended that all matter contained in the above description or shown in the accompanying drawing shall, unless otherwise described, be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A plated wire memory plane comprising:
- (A) a first grid of substantially parallel plated conductor memory elements,
- (B) a second grid of substantially parallel conductors extending transverse to said plated memory elements and closely spaced therefrom,
- (C) a sheet-like dielectric spacer
  - (1) disposed between said grid of conductors and said grid of plated memory elements,
  - (2) defining on the surface thereof remote from said plated memory elements a reference surface to which said grid of conductors is secured,
  - (3) having a thickness dimension of selected value, and
  - (4) contiguous with said grid of plated memory elements to define with said thickness dimension thereof the spacing from said memory elements to said reference surface, and
  - (5) defining with said grid of memory elements interstices between adjacent memory elements, and
- (D) dielectric means
  - (1) co-extensive with said dielectric spacer,
  - (2) filling the interstices between adjacent memory elements, and
  - (3) securing said memory elements and said conductors to said spacer.
- (E) said dielectric spaced being composed of a material different from the material of said dielectric means so as to co-operate with said dielectric means and form for said memory elements a support stronger than said dielectric means.

2. A memory plane as defined in claim 1 further characterized in that said dielectric spacer has the mechanical property of maintaining said thickness dimension at a selected value during the making of said memory plane.

3. A memory plane as defined in claim 1 further characterized in that
- (A) said dielectric means is a plastic material, and
- (B) said spacer is porous and absorbent to said plastic material when the material is in a fluid state.

4. A memory plane as defined in claim 1 in which said dielectric means is a synthetic thermosetting resin of relatively low dielectric constant.

5. A memory plane as defined in claim 1 in which said spacer is a crush-resistant sheet-like structure of thermosetting plastic fibrous material having a relatively low dielectric constant.

6. A plated wire memory plane is defined in claim 1 in which said spacer is a crush-resistant sheet-like structure of fibrous material having a relatively low dielectric constant.

7. A plated wire memory plane as defined in claim 6 in which said fibrous material is selected principally from the materials of glass, linen, cellulose, and thermosetting plastic.

8. A plated wire memory plane as defined in claim 6 in which said sheet-like spacer structure is formed of said fibrous material by the process of weaving, matting or water-laying.

9. A plated wire memory plane as defined in claim 1 in which said spacer is a woven sheet-like structure with the woven strands thereof oriented on the bias relative to said plated wire memory elements.

10. A tunnel structure of dielectric material having first and second opposed surfaces and having formed therein a plurality of elongated tunnel extending longitudinally relative to said surfaces, said tunnel structure comprising the improvement of
- (A) first and second sheet-like dielectric spacers
  - (1) embedded therein,
  - (2) each having a prescribed thickness,
  - (3) each filling the space between said tunnels and the same-numbered surface with said prescribed thickness, and
  - (4) of crush-resistant structure so as to constrain rods disposed in said tunnels to be spaced from said surface by said prescribed thickness.

11. A tunnel structure as defined in claim 10 in which said tunnel structure is formed of said spacers and a bonding material joining said spacers together between said tunnels.

12. A tunnel structure as defined in claim 10
- (A) further comprising a dielectric plastic material bonding said spacers together, and
- (B) in which said spacers are porous and absorbent to said plastic material when it is in a flowable state.

13. A tunnel structure as defined in claim 10
- (A) further comprising a dielectric material bonding said spacers together, and
- (B) in which said spacers are of a woven structure oriented with the strands thereof diagonal to the elongation of said tunnels.

References Cited

UNITED STATES PATENTS

| | | | |
|---|---|---|---|
| 2,710,909 | 6/1955 | Logan et al. | 264—272 |
| 2,928,138 | 3/1960 | Boggs | 264—272 |
| 3,175,200 | 3/1965 | Hoffman et al. | 340—174 |
| 3,301,932 | 1/1967 | Chisholm | 264—174 |
| 3,371,326 | 2/1968 | Fedde | 340—174 |
| 3,414,972 | 12/1968 | Reid et al. | 29—604 |
| 3,449,731 | 6/1969 | Chow | 340—174 |
| 3,460,113 | 8/1969 | Maeda | 340—174 |
| 3,460,114 | 8/1969 | Chow | 340—174 |
| 3,465,308 | 9/1969 | Sasaki et al. | 340—174 |

OTHER REFERENCES

"Closed-Flux Magnetic Thin Film Device" by M. G. Pecheux, IBM T.D.B., vol. 6, No. 4, September 1963, p. 137.

STANLEY M. URYNOWICZ, Jr., Primary Examiner

K. E. KROSIN, Assistant Examiner

U.S. Cl. X.R.

264—256, 261